(12) United States Patent
Furlotti (10) Patent No.: US 11,607,835 B2
(45) Date of Patent: Mar. 21, 2023

(54) STATION FOR HEATING THERMOPLASTIC SHEET-LIKE BLANKS FOR THERMOFORMING LINES

(71) Applicant: I.M.A. INDUSTRIA MACCHINE AUTOMATICHE S.P.A IN SIGLA IMA S.P.A., Ozzano dell'Emilia (IT)

(72) Inventor: Filippo Furlotti, Traversetolo (IT)

(73) Assignee: I.M.A. INDUSTRIA MACCHINE AUTOMATICHE S.P.A IN SIGLA IMA S.P.A., Ozzano dell'Emilia (IT)

( * ) Notice: Subject to any disclaimer, the term of this patent is extended or adjusted under 35 U.S.C. 154(b) by 875 days.

(21) Appl. No.: 16/481,692

(22) PCT Filed: Feb. 8, 2018

(86) PCT No.: PCT/EP2018/053213
§ 371 (c)(1),
(2) Date: Jul. 29, 2019

(87) PCT Pub. No.: WO2018/146215
PCT Pub. Date: Aug. 16, 2018

(65) Prior Publication Data
US 2020/0001517 A1    Jan. 2, 2020

(30) Foreign Application Priority Data
Feb. 10, 2017 (IT) .......................... 102017000014665

(51) Int. Cl.
*B29C 51/22* (2006.01)
*B29C 51/42* (2006.01)
(Continued)

(52) U.S. Cl.
CPC ............ *B29C 51/421* (2013.01); *B29C 51/22* (2013.01); *B29C 66/849* (2013.01); *B65B 47/02* (2013.01); *B29L 2031/712* (2013.01)

(58) Field of Classification Search
USPC ............................................................ 432/10
See application file for complete search history.

(56) References Cited

U.S. PATENT DOCUMENTS 3,964,237 A * 6/1976 Johansen ................ B65B 3/027
425/388
4,158,539 A   6/1979 Arends et al.
(Continued)

FOREIGN PATENT DOCUMENTS

CN      1041129 A       4/1990
CN    201669888 U      12/2010
(Continued)

OTHER PUBLICATIONS

CN Office Action dated Jan. 18, 2021 re: Application No. 201880010588.5, pp. 1-14, citing: WO0181069A1, CN204914542U, CN1041129A, CN201669888U, CN102639313A, CN104097315A, U.S. Pat. No. 4,158,539 A and JPS6216125A.
(Continued)

*Primary Examiner* — Chinyere J Rushing-Tucker
(74) *Attorney, Agent, or Firm* — Cantor Colburn LLP (57) ABSTRACT

A station for heating thermoplastic sheet-like blanks for a thermoforming line includes a heating carousel which can rotate continuously about a central axis and which has a number of heating heads radially spaced apart from the central axis. Each heating head is adapted to receive at least one respective thermoplastic sheet-like blank at a first peripheral region which is outside the carousel, to retain the at least one blank during the rotation of the carousel while supplying heat to it, and to release the at least one blank to a second peripheral region which is outside the carousel and is angularly spaced apart from the first region.

8 Claims, 8 Drawing Sheets

(51) Int. Cl.
*B29C 65/00* (2006.01)
*B65B 47/02* (2006.01)
*B29L 31/00* (2006.01)

(56) References Cited

U.S. PATENT DOCUMENTS

| | | |
|---|---|---|
| 4,208,955 A | 6/1980 | Doll et al. |
| 6,094,890 A | 8/2000 | Michellon et al. |
| 2011/0204547 A1 | 8/2011 | Lofgren |

FOREIGN PATENT DOCUMENTS

| | | |
|---|---|---|
| CN | 102639313 A | 8/2012 |
| CN | 104097315 A | 10/2014 |
| CN | 204914542 U | 12/2015 |
| EP | 1404505 A1 | 4/2004 |
| JP | S6216125 A | 1/1987 |
| WO | 0181069 A1 | 11/2001 |
| WO | 02098630 A1 | 12/2002 |

OTHER PUBLICATIONS

International Search Report dated Mar. 12, 2018 re: Application No. PCT/EP2018/053213, pp. 1-4, citing: U.S. Pat. No. 4,208,955 A, WO 01/81069 A1, EP 1 404 505 A1 and US 20110204547 A1.
IT Search Report dated Nov. 13, 2017 re: Application No. IT 2017000014665, pp. 1-8, citing: U.S. Pat. No. 4,208,955 A, WO 01/81069 A1, EP 1 404 505 A1 and US 20110204547 A1.
Written Opinion dated Mar. 12, 2018 re: Application No. PCT/EP2018/053213, pp. 1-7, citing: U.S. Pat. No. 4,208,955 A, WO 01/81069 A1, EP 1 404 505 A1 and US 20110204547 A1.

* cited by examiner

STATION FOR HEATING THERMOPLASTIC SHEET-LIKE BLANKS FOR THERMOFORMING LINES

TECHNICAL FIELD

The present disclosure relates to a station for heating thermoplastic sheet-like blanks, particularly for thermoforming lines of the rotary type and for continuous FFS (form-fill-seal) packaging lines.

BACKGROUND

Known solutions are based on linear machines, such as for example the one described in U.S. Pat. No. 6,094,890. These solutions however have a series of limitations that are associated precisely with deployment in a production line. One of these limitations, for example, is an extremely low flexibility owing to the fact that the machine spacing is linked to the diameter of the containers, so that, when it becomes necessary to modify the latter, the machine has to be subjected to extensive modifications, which affect especially the overall length of the machine, with the consequence that a machine designed to work on containers that have a certain diameter cannot work on containers with a larger diameter, except at the expense of adaptations that are entirely uneconomical or incompatible with the space originally allocated to the machine.

It is known from U.S. Pat. No. 3,964,237 to provide a thermoforming line in which, in order to obtain thermoformed containers, thermoplastic sheet-like blanks are used, in particular disks, which are individually heated, molded, filled and closed without resorting to die-punching.

The advantage of the solution known from U.S. Pat. No. 3,964,237 is that, differently from other conventional solutions which entail molding a plurality of containers on a sheet of thermoplastic material fed by a spool, the volume occupied by such spool is considerably greater than that occupied by the sheet-like blanks of U.S. Pat. No. 3,964,237 in order to obtain the same number of containers.

A drawback of the solution known from U.S. Pat. No. 3,964,237 is that it operates at low speeds. In particular, the heating station of U.S. Pat. No. 3,964,237 operates intermittently.

U.S. Pat. No. 4,208,955 discloses a container manufacturing apparatus in which tubular blanks are moved through an endless conveyor and are delivered to a heating turret having bottom heating means.

WO 01/81069 discloses a rotating conditioning station having circumferentially spaced heaters, each heater comprising an upper heating element shaped to conform with the hollow interior of a preform and a lower heating element shaped to conform with the preform, wherein the combination of upper and lower elements can embrace and contain the preform and are movable between an operative position encasing the preform and a displaced position remote from the preform.

EP 1404505 discloses to arrange clam shell molds on a rotating frame, which receive thermoplastic material from a sheet extruder.

SUMMARY

The aim of the present disclosure is to provide a heating station for lines for thermoforming thermoplastic sheet-like blanks from which to obtain respective containers, which is capable of improving the prior art in one or more of the above mentioned aspects.

Within this aim, the disclosure prepares the thermoplastic sheet-like blanks for the subsequent individual thermoforming at a higher rate of production than that of the known art.

The disclosure enables the continuous heating and release of thermoplastic sheet-like blanks in order to enable their individual thermoforming.

The disclosure facilitates the manipulation of the thermoplastic sheet-like blanks after their heating.

The disclosure also provides a station for heating thermoplastic sheet-like blanks and a corresponding method that can be used in an FFS (form-fill-seal) packaging line.

Furthermore, the present disclosure overcomes the drawbacks of the prior art in a different manner to any existing solutions.

The disclosure further provides a heating station that is highly reliable, easy to implement and low cost.

This aim and these and other advantages which will become better apparent hereinafter are achieved by a station for heating thermoplastic sheet-like blanks for a thermoforming line, characterized in that it comprises a heating carousel which can rotate continuously about a central axis and which has a plurality of heating heads which are radially spaced apart from said central axis, each heating head being adapted to receive at least one respective thermoplastic sheet-like blank at a first peripheral region which is outside the carousel, to retain said at least one blank during the rotation of the carousel while supplying heat to it, and to release said at least one blank to a second peripheral region which is outside the carousel and is angularly spaced apart from the first region.

The aim and advantages of the disclosure are likewise achieved by providing a method of continuously heating thermoplastic sheet-like blanks for subsequent thermoforming, characterized in that it comprises the steps of continuously rotating a carousel about a central axis, said carousel having a plurality of heating heads which are radially spaced apart from said central axis;

at a first peripheral region which is outside said carousel, feeding thermoplastic sheet-like blanks to said heating heads, so that each heating head that passes through said first region receives a respective sheet-like blank;

during said rotation, holding said blanks in the respective heating heads and applying heat to said blanks;

releasing said sheet-like blanks to a second region around the carousel that is angularly spaced apart from the first region.

Each heating head comprises clamping means adapted to retain the at least one blank on a clamping surface of the blank during its heating. The clamping means comprise at least two jaws, which are mobile with respect to each other along an axis which is substantially parallel to the central axis of rotation of the carousel in order to clamp between these jaws the blank at the clamping surface. Heat is supplied to an area of the blank that is not affected by such clamping.

BRIEF DESCRIPTION OF THE DRAWINGS

Further characteristics and advantages of the disclosure will become better apparent from the detailed description that follows of a preferred, but not exclusive, embodiment of the heating station according to the disclosure, which is illustrated for the purposes of non-limiting example in the accompanying drawings wherein.

DETAILED DESCRIPTION OF THE DRAWINGS

With reference to the FIGS. 1-10, a line for packaging containers fillable with loose material using thermoforming, generally designated by the reference numeral 1, comprises a magazine 2 of thermoplastic sheet-like blanks G, a station 3 for feeding the blanks to a subsequent station 4 for heating the blanks, a station 5 for thermoforming containers starting from such blanks, a station 6 for filling the containers with the loose material, and a station 7 for sealing the filled containers by way of seals supplied by a station for feeding seals 9.

Figures 7, 10:
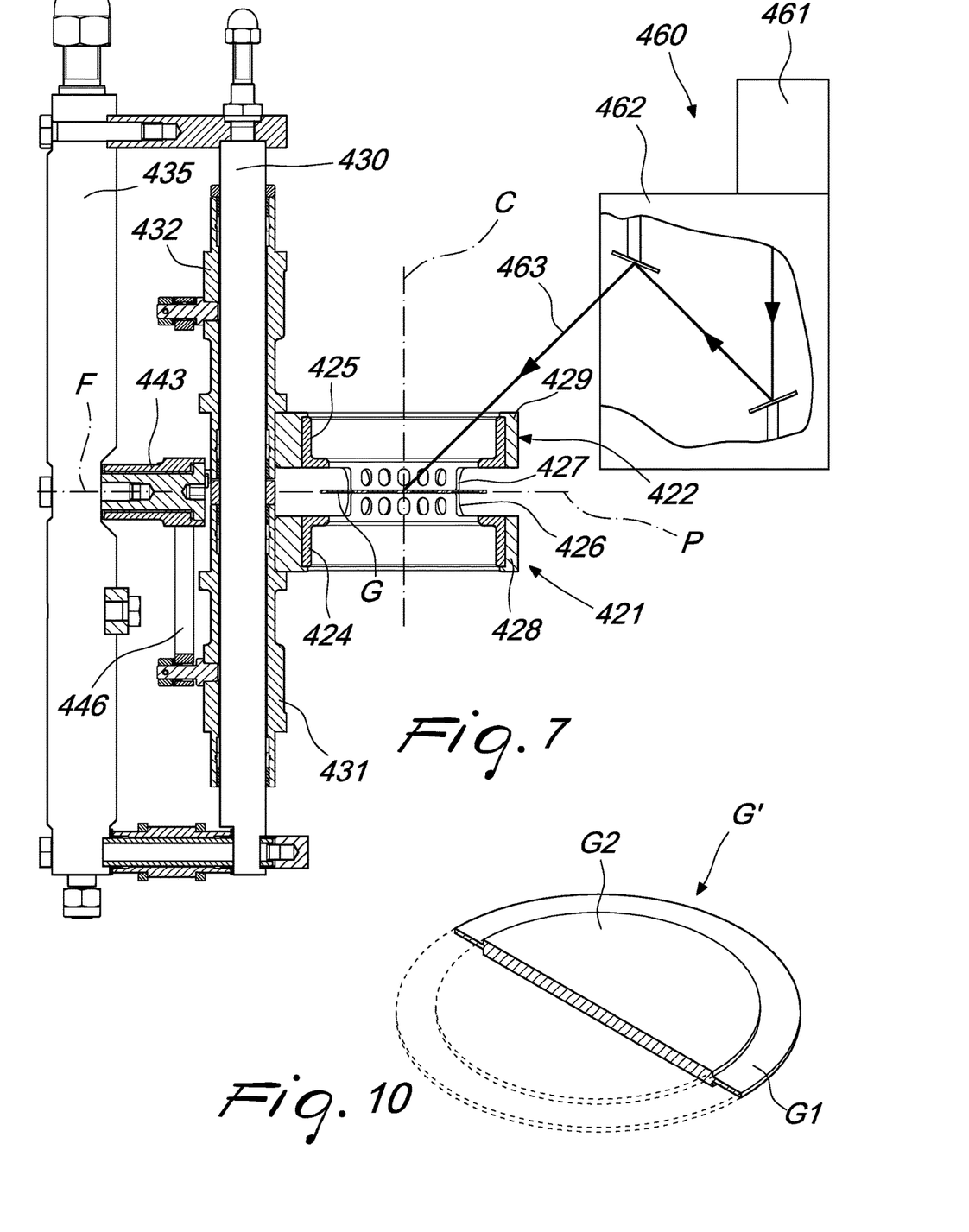
FIG. 7 is a cross-sectional side view of a heating head of the carousel in FIG. 2 according to a second embodiment of the disclosure, in the configuration of clamping the blank.
FIG. 10 shows cross-sectional perspective view of an alternative sheet-like blank for use in the disclosure.

The thermoplastic sheet-like blanks G comprise, or are entirely constituted by, a "token" of thermoformable plastic material, for example a thermoplastic polymer, preferably of the type suitable for foods, such as PS, HIPS, PET or the like. Generally, each blank G can have any shape in plan view, for example round, square, rectangular, oval, polygonal, that corresponds to the plan of the final container that it is desired to provide or of the rim of its mouth. In the preferred and illustrated embodiments, each blank G is adapted to the formation of a single container and has, but is not limited to, a disk-like shape. The faces of this disk-like blank G are entirely planar as showed for example in FIG. 3. An alternative disk-like blank G' that can be used in the disclosure is depicted in FIG. 10 and is characterized in that it is thinner at a peripheral annulus of the blank than in the remaining portion of the blank.

Preferably, the containers obtained with the thermoforming station 5 are tubs, adapted for example to be filled in the filling station 6 with an edible substance in the form of a particulate or a fluid, for example with yogurt, in order to be then sealed with "peelable" sheet covers (for example plastic/aluminum laminates).

Figure 1:
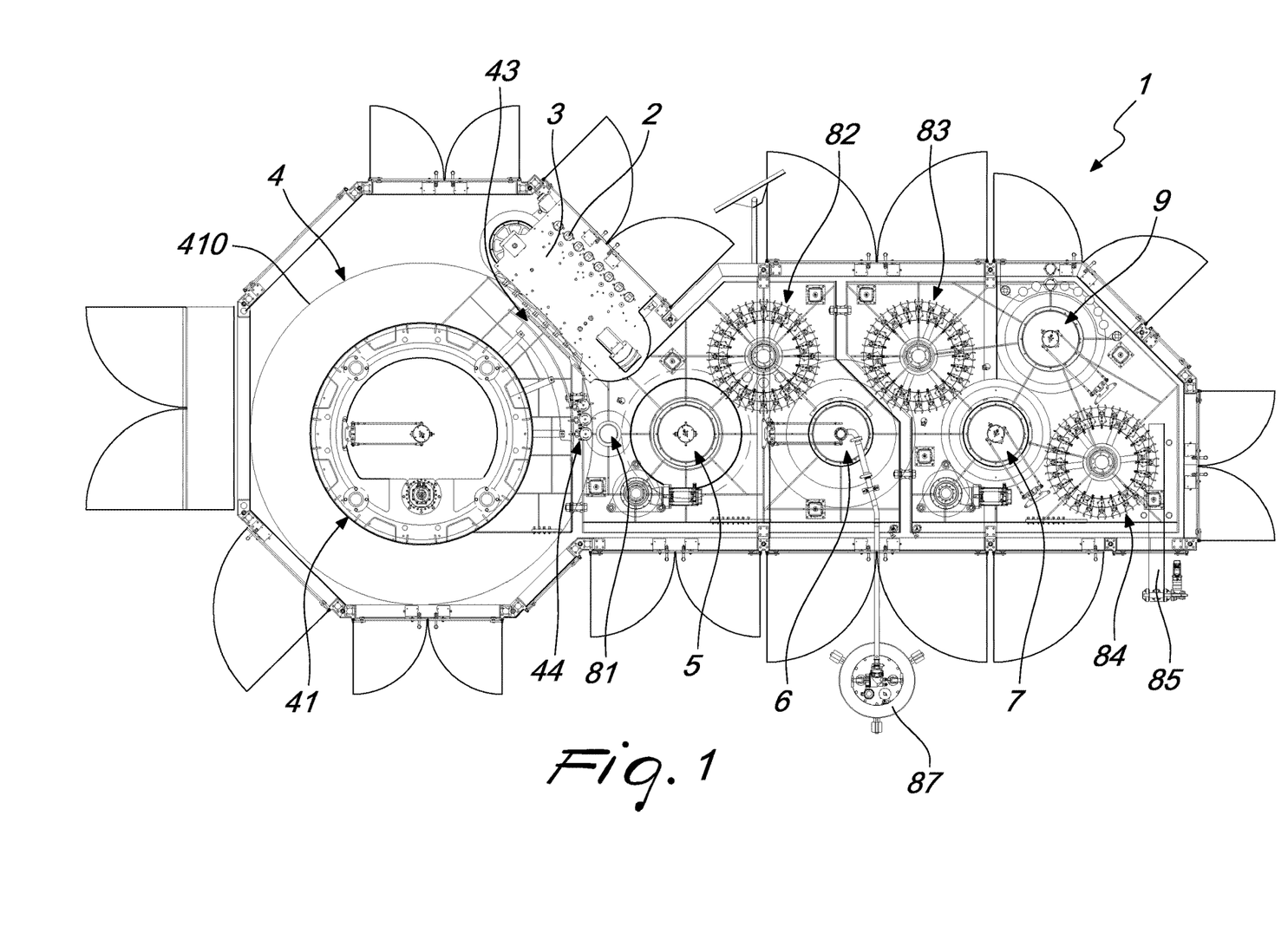
FIG. 1 is a plan view of an FFS (form-fill-seal) thermoforming and packaging line that uses the heating station according to the disclosure.
Figure 2:
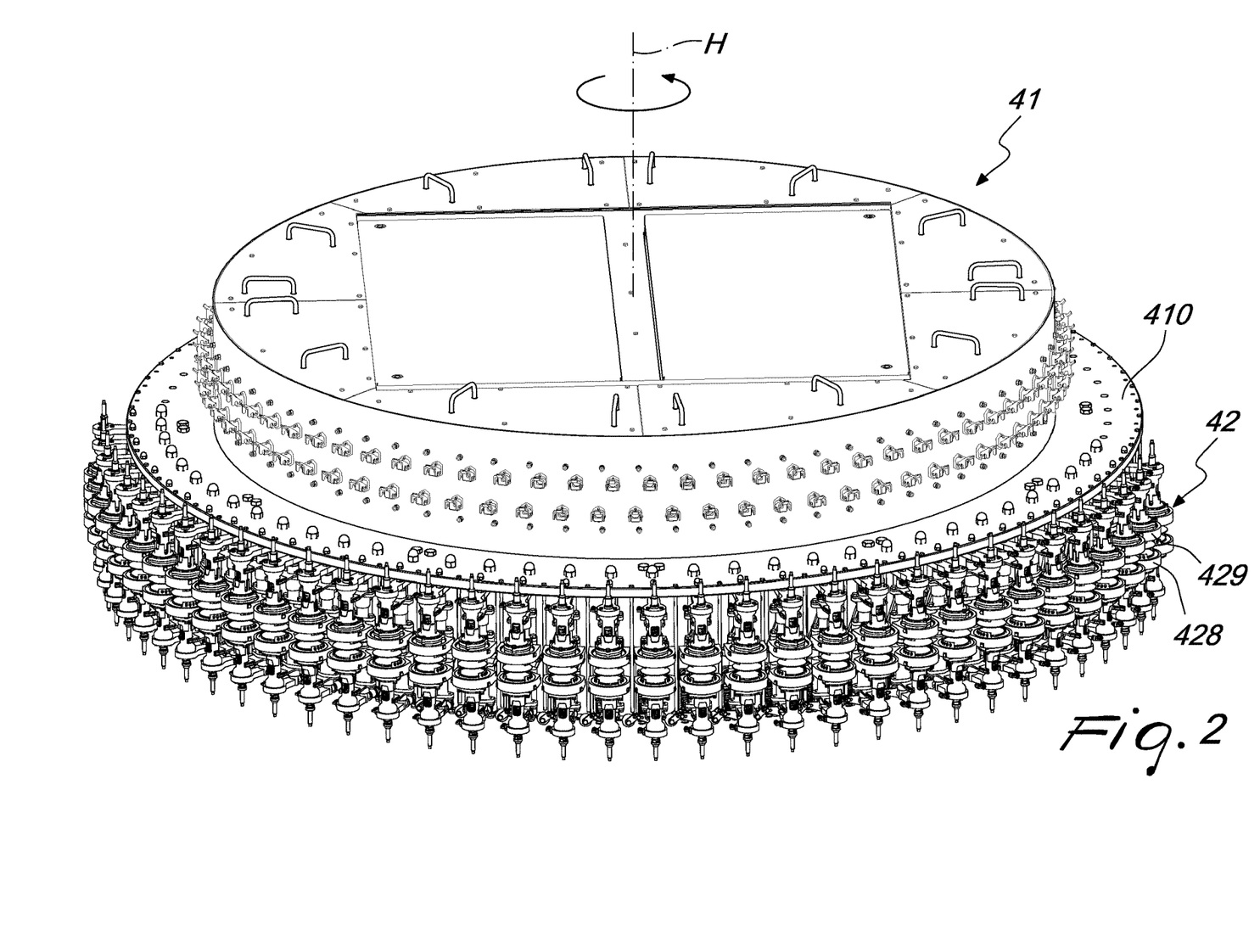
FIG. 2 is a perspective view of the heating carousel used in the line in FIG. 1.

The heating station 4 comprises a heating carousel 41 which can rotate continuously about a central axis H and which has a plurality of heating heads 42 that are radially spaced apart from the central axis H.

Each heating head 42 is adapted to receive at least one respective thermoplastic sheet-like blank G at a first peripheral region 43 outside the carousel, to retain this respective blank G, preferably by axial clamping, during rotation of the carousel while supplying heat to it in order to make it reach a temperature of thermoforming or permanent deformation, and to release the blank thus heated to a second peripheral region 44 which is outside the carousel 41 and angularly spaced apart from the first region 43. In the second peripheral region 44 an output star conveyor 81 may be provided, which constitutes the input star conveyor for the subsequent thermoforming station 5 and which performs the transfer of the heated blank G from the station 4 to the station 5.

Figure 3:
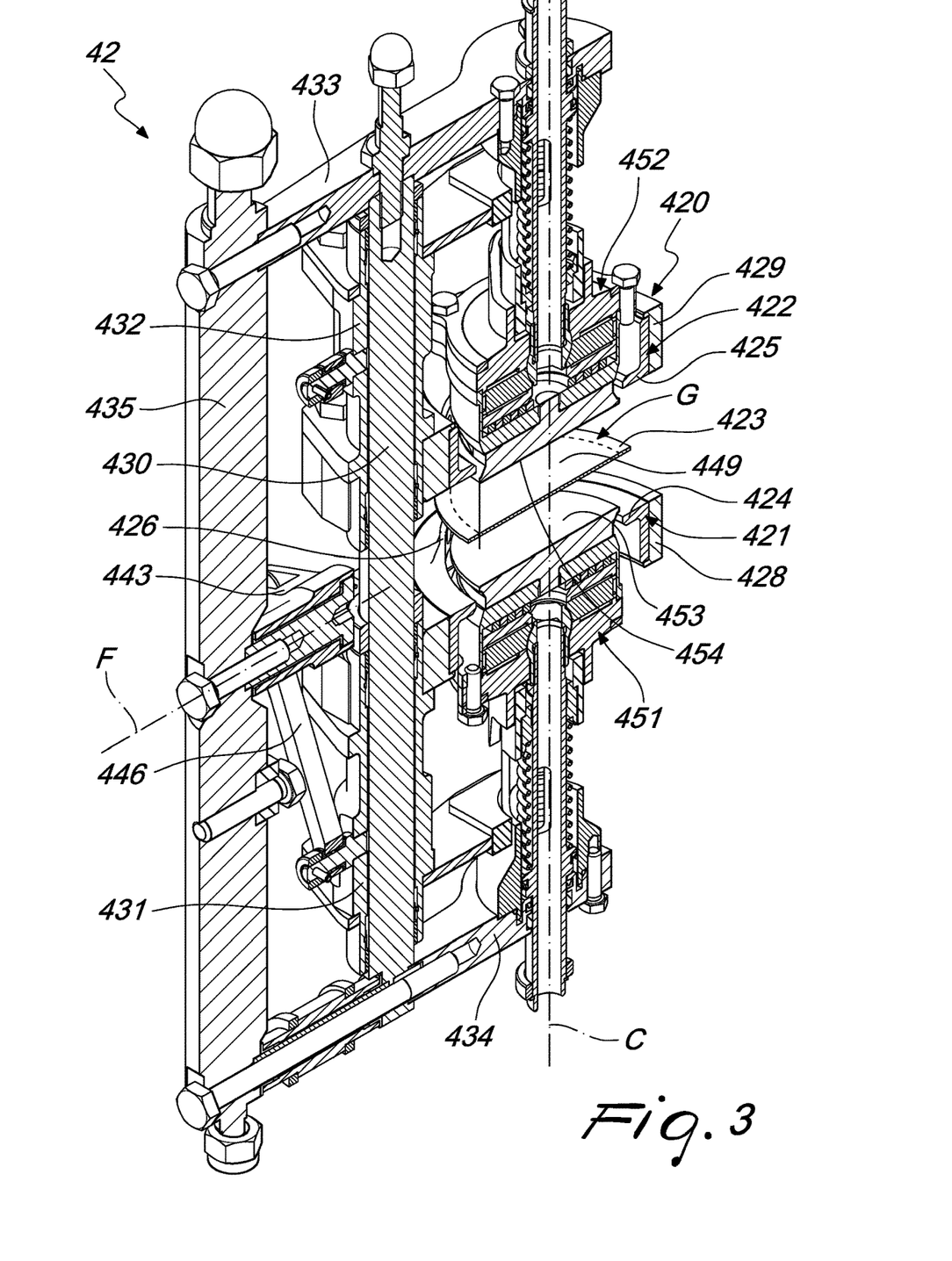
FIG. 3 is an axial cross-sectional perspective view of a heating head of the carousel in FIG. 2, in the open configuration.
Figure 4:
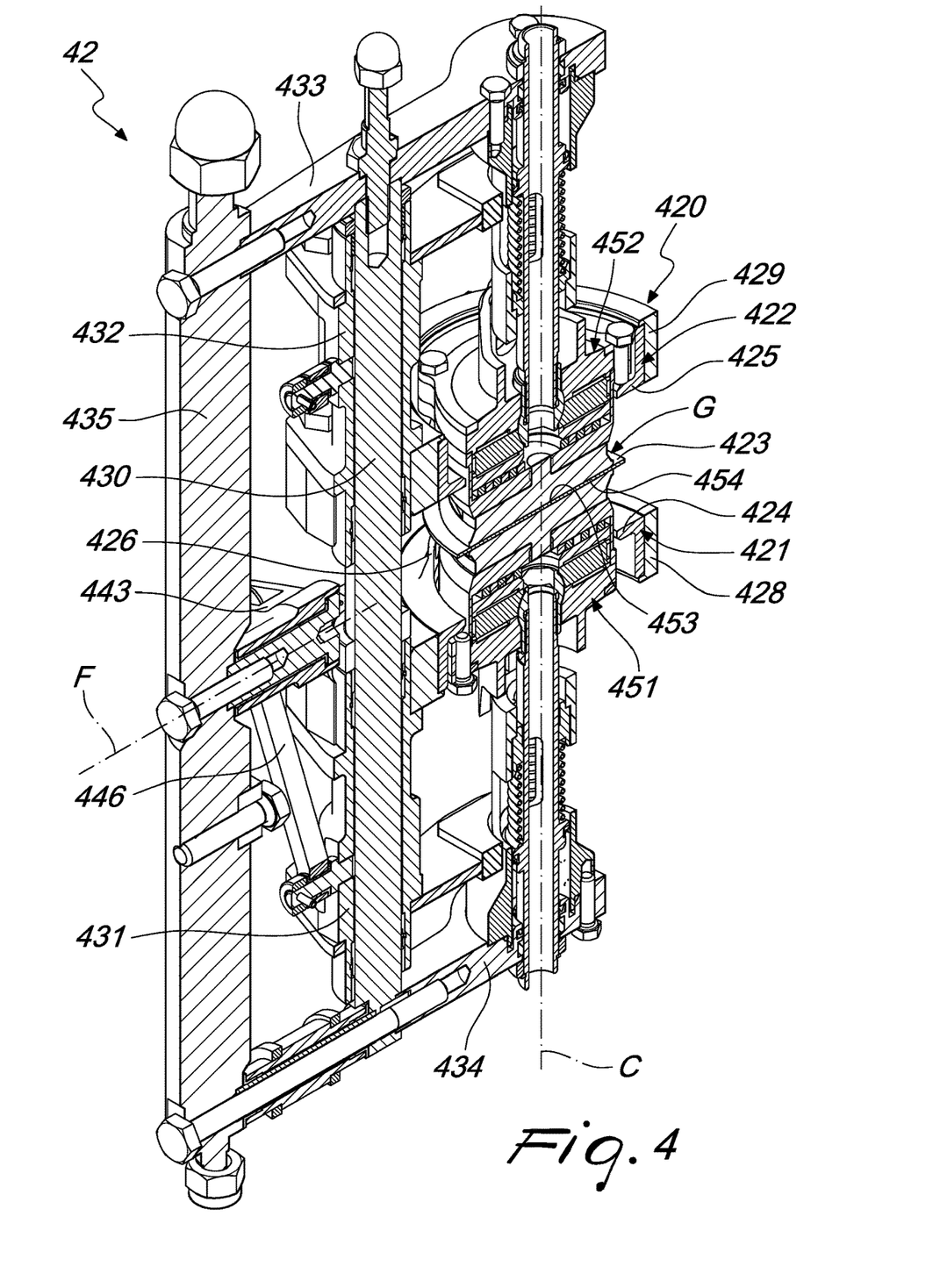
FIG. 4 is an axial cross-sectional perspective view of a heating head of the carousel in FIG. 2, in the configuration of clamping and heating the blank.
Figure 5:
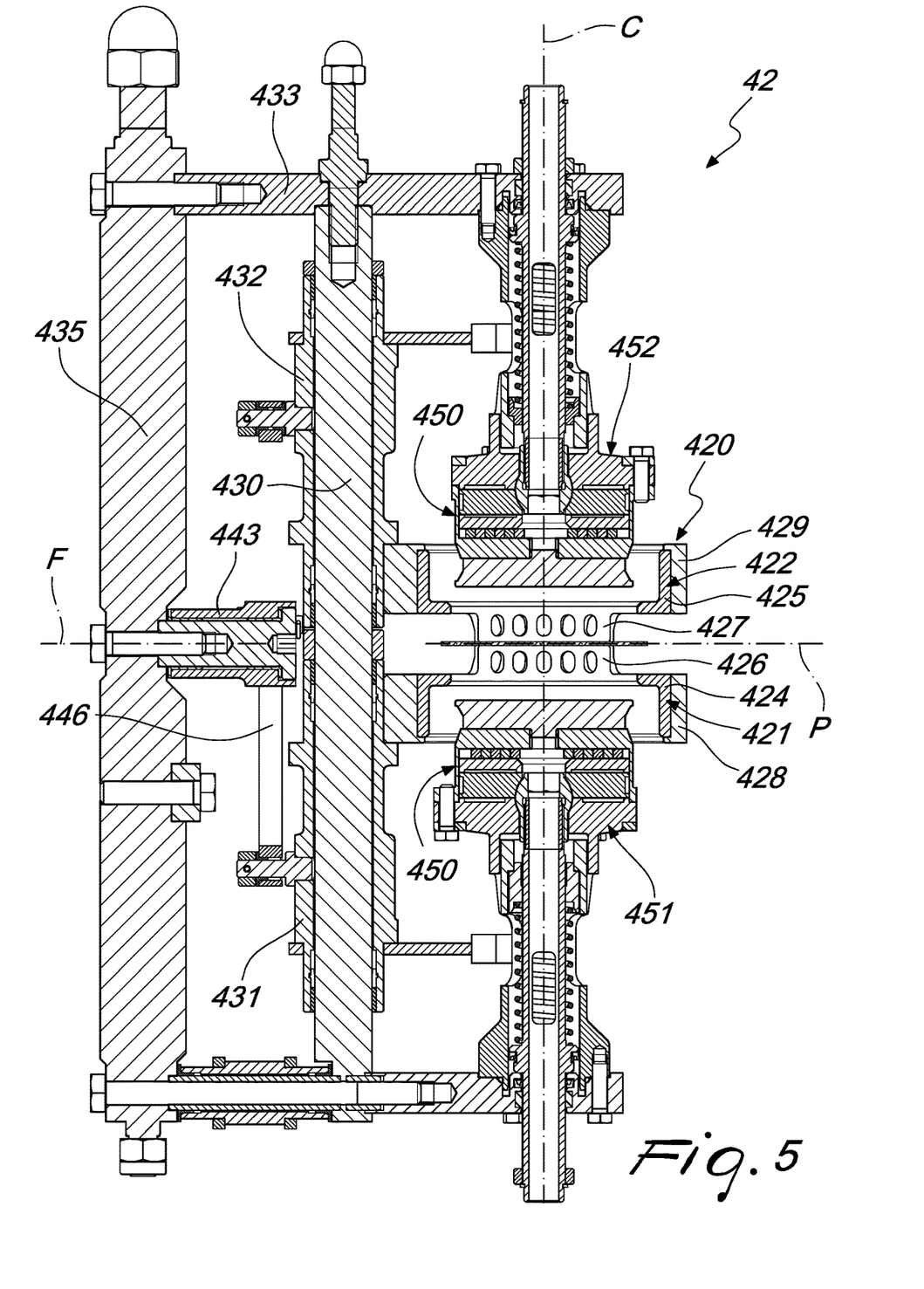
FIG. 5 is a cross-sectional side view of a heating head of the carousel in FIG. 2, in the configuration of only clamping the blank.

Each heating head 42 can comprise clamping means 420 which are adapted to retain the blank G on a clamping surface P at the peripheral region of the blank G during the heating thereof. Each heating head 42 can also comprise at least one heat source 450 which is associated with the clamping means 420 and which can move with respect to the clamping surface P so as to heat an area of the blank that is not affected by the aforementioned clamping. For example, when the blank G is disk-shaped, as in the case shown in the drawings, the area 449 of the disk which is heated to at least the thermoforming temperature of the material of the blank G is a circle having a smaller diameter than that of the disk, thus leaving a "cold" ring 423 on the disk on which the clamping means 420 act in order to retain the disk during rotation of the carousel 41 until its release to the output star conveyor 81.

The clamping means 420 preferably comprise at least two jaws 421-422 which are axially mutually opposite and can mutually move along a clamping axis C which is substantially parallel to the central axis H of rotation of the carousel 41 in order to clamp between them the blank G at its peripheral region 423.

Such jaws 421, 422 can comprise respective annular structures 424, 425 which are provided with respective protrusions 426, 427, for example curved walls, which perform the clamping of the blank G on opposite faces of the peripheral region 423. The structure annular 424, 425 is preferably at least partially made of thermally insulating material and optionally the protrusions 426, 427 are perforated so as to reduce as much as possible the exchange of heat with the peripheral region 423 of the blank G.

The jaws 421, 422 are preferably mounted slideably on a same fixed straight guide 430, directly or indirectly, on the peripheral region 410 of the heating carousel 41 and directed parallel to the clamping axis C.

For example, in the preferred embodiment shown, the annular structures 424, 425 are mounted on annular supports 428, 429 which are fixed in a cantilever fashion on sliders 431, 432 which are fitted slideably onto the straight guide 430. Such guide 430 can be fixed to cross-arms 433, 434 of a rod 435 which is fixed directly onto the peripheral region 410 of the heating carousel 41.

Figure 6:
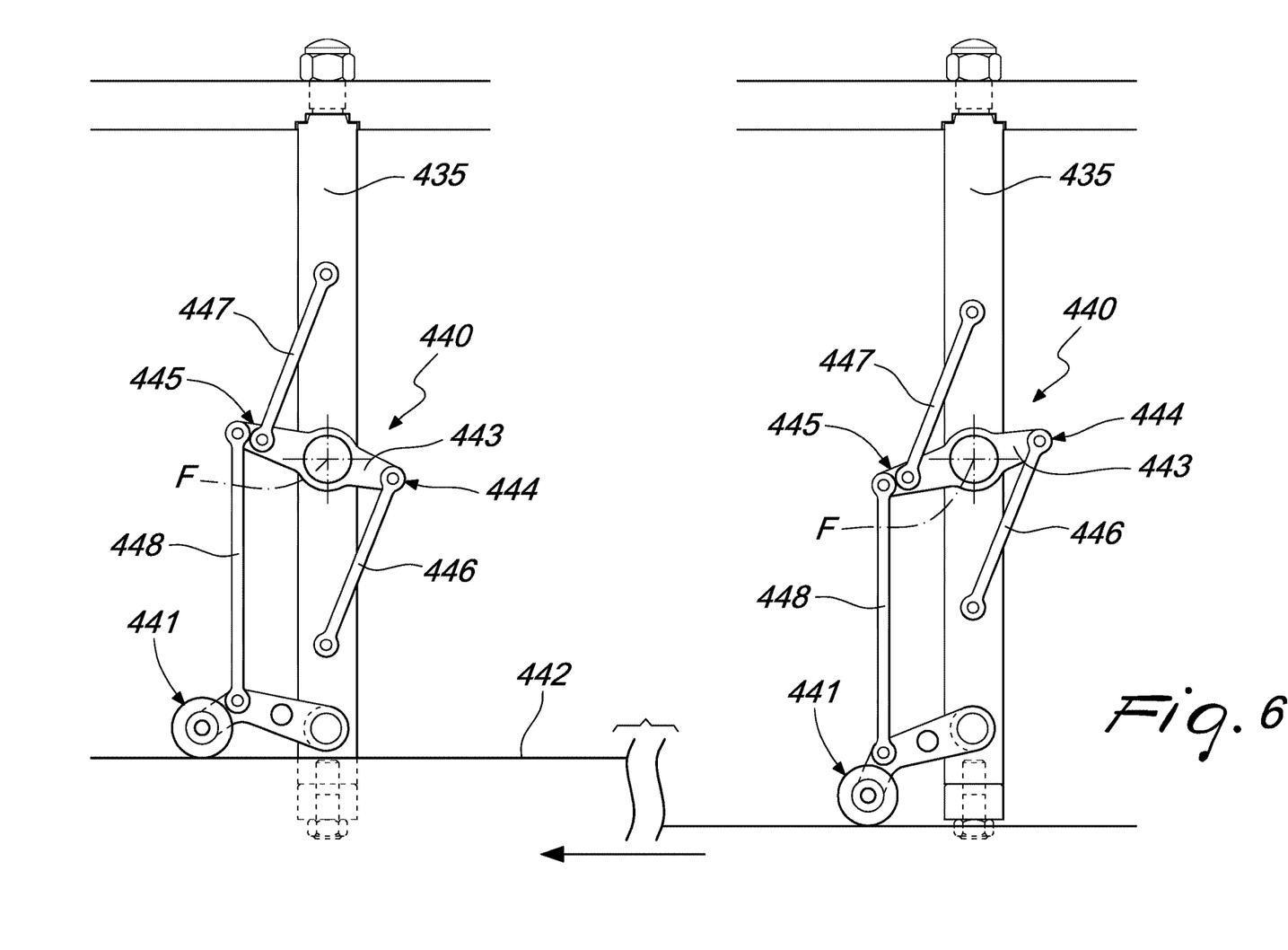
FIG. 6 is a diagram of the articulated quadrilateral mechanism used in the heating head in the previous figures.

The jaws 421, 422 can furthermore be connected to an articulated quadrilateral mechanism 440 which is associated with a cam follower 441 which interacts with a fixed cam 442 of the heating station arranged in a fixed position about the rotation axis H, so as to mutually approach or space apart the jaws 421, 422 via said articulated quadrilateral.

The articulated quadrilateral mechanism 440 can comprise a rocker arm 443 which has a fulcrum F which is rotatably fitted at a fixed point of the peripheral region 410 of the heating carousel, for example on the rod 435, and which has the two respective ends 444, 445 connected to a respective jaw 421, 422 by way of respective links 446, 447, so that a rotation of the rocker arm 443 about the fulcrum F entails the mutual approach or spacing apart of the jaws 421, 422.

The links 446 and 447 can be pivoted on the respective sliders 431, 432.

To command the rotation of the rocker arm 443, one of the ends of the rocker arm 443, for example the first end 445, is advantageously connected to the cam follower 441, which is preferably of the type with a rocker arm and a roller, so that the interaction between the cam follower 441 and the fixed cam 442 commands the rotation of the rocker arm and, as a consequence, the opening and closing of the jaws 421, 422. The connection between the cam follower 441 and the end 445 of the rocker arm in this case is obtained by way of a third link 448.

In an alternative embodiment, not shown, a cam-following roller can be applied directly to the aforementioned end 445 of the rocker arm.

The heat source 450 can also move along the clamping axis C, and in particular it is moved by way of an actuation independent of the actuation that mutually moves the two jaws 421, 422 with respect to each other, for example by way of a pneumatic actuation.

The heat source 450 is preferably resistive and can be mounted on a pair of supports 451, 452 which can be moved mutually closer from opposite sides toward the clamping surface P, preferably so as to apply a hold on both faces of the blank G and transmit the heat by conduction onto a limited area 449 of such faces which is intended to be deformed during the subsequent thermoforming.

To this end, the supports 451, 452 of the heat source comprise a surface 453, 454 for transmission of heat by conduction which is smaller than the area of the faces of the blank G to be heated, so that the clamping performed by the jaws 421, 422 takes place in a peripheral sector 423 of the blank which is not directly heated by the heat source 450.

In alternative embodiment, a disk-like blank G' is provided (FIG. 10) which is thinner at a peripheral annulus G1 of the blank G' than in the remaining circular portion G2 of the blank, which corresponds to the area to be heated by the heating head 42. For example, a symmetrical step can be provided along the entire periphery of the blank G', as depicted in FIG. 10. A heating head 42 of a single, large diameter can be accordingly used for various disk-like blanks G' having different diameters: in fact, once the heating surfaces 453, 453 contact the circular portion G2, the annulus G1, will not contact these heating surfaces 453, 454 thanks to its reduced thickness and will accordingly remain cold, while heat is transmitted by the heating surfaces 453, 454 only to the remaining circular portion G2 of greater thickness than the annulus G1.

In a further alternative embodiment, not shown, the transmission of heat can occur by irradiation, for example with a heat source of the IR lamp type. In this case, the divergence of the IR beam will be such as to heat only the area 449 to a thermoforming temperature.

A laser can be used as a further alternative source of heat by irradiation, as showed in FIG. 7. In this case, with respect to the embodiment of FIG. 5, the only remaining elements of the figure that are coaxial to axis C are the jaws 421, 422, the annular structures 424, 425 and their annular supports 428, 429, while one or more laser heat sources 460 are mounted around the periphery of the heating carousel 41. As showed in FIG. 7, each laser heat source 460 may comprise a laser beam source 461 and an optional mirror system 462 adapted to direct the heating laser beam 463 to the central area 449 of the sheet-like blank G In an alternative embodiment, the laser beam can be directed to the central area 449 of the sheet-like blank G without any mirror, e.g. by arranging the laser beam source on the heating head so that the laser beam is coaxial or parallel to the clamping axis C.

Operation of the heating stations according to the disclosure is evident from the foregoing description. In particular, the carousel 41 is rotated continuously about the central axis H, for example by way of a direct-drive motor on the central shaft of the carousel or a motor connected to such shaft by way of a transmission. In FIG. 1, the direction of rotation of the carousel 41 is anticlockwise.

The fixed cam 442 can be configured to make the rocker arm 443 rotate in the direction of mutual spacing apart of the jaws 421, 422 at the feeding station 3 and in particular at the second outer peripheral region 44, so that each heating head 42 receives a respective sheet-like blank G from the feeding station without stopping. The rotation of the rocker arm in the direction of opening of the jaws can, alternatively, be done by way of a spring, not shown, which acts on the cam follower 441 or directly on one end 444, 445 of the rocker arm 443.

After insertion of the blank G between the clamping means 420, for example by releasing the blank G resting on the protrusions 426, the rocker arm 443 is rotated in the opposite direction with respect to the direction of opening of the jaws 421, 422, by way of the interaction between the cam followers 441 and the fixed cam 442, thus effecting a retention of the blanks G in the respective heating heads 42 along the path from the first region 43 to the second region 44.

During such path, the mutual approach of the supports 451, 452 of the heat source is actuated pneumatically so as to heat the area 449 of the blank G. The temperature reached is substantially equal to or exceeding the thermoforming or permanent deformation temperature of the material that constitutes the blank G.

Once the second peripheral region 44 is reached, the rocker arm 443 is rotated again in order to allow the release of the blanks G, for example to the output star conveyor 81.

Figure 8:
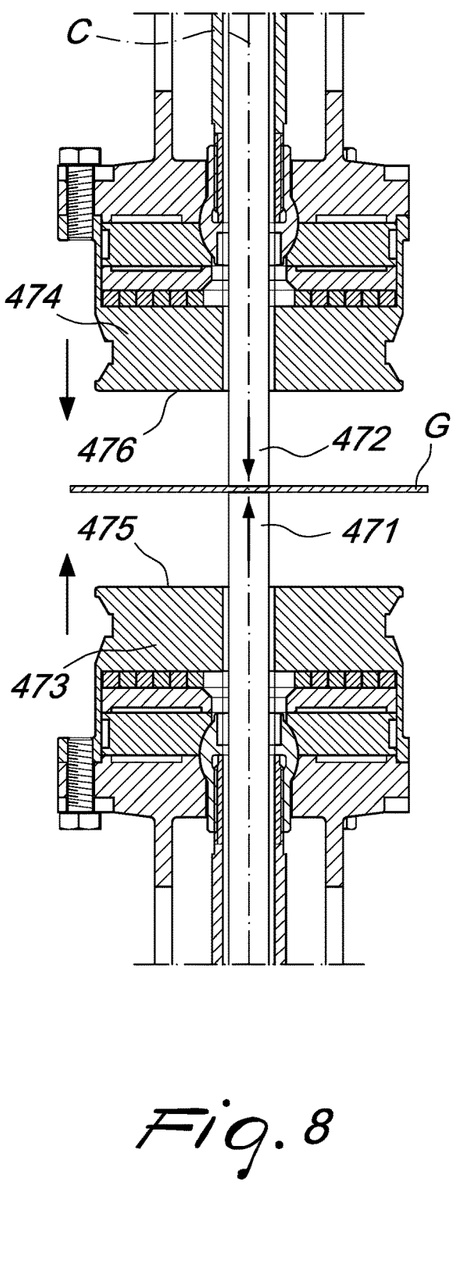
FIG. 8 is a cross-sectional side view of a heating head of the carousel in FIG. 2 according to a third embodiment of the disclosure, in the configuration of only clamping the blank.
Figure 9:
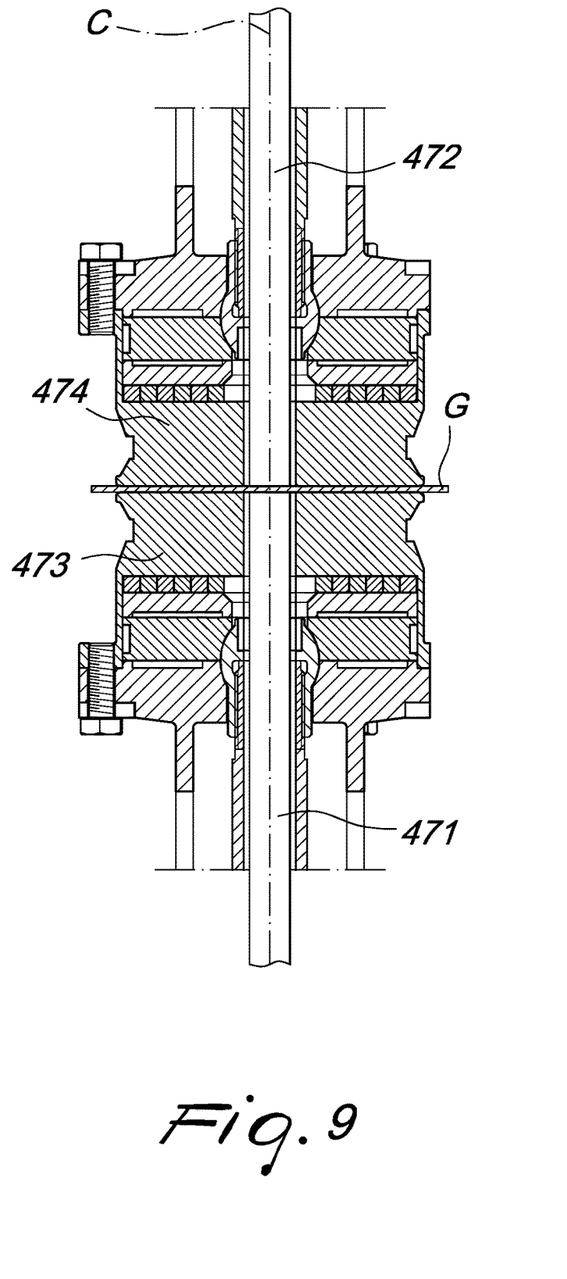
FIG. 9 is a cross-sectional side view of a heating head of the carousel in FIG. 2 according to a third embodiment of the disclosure, in the configuration of clamping and heating the blank.

According to an alternative embodiment showed in FIGS. 8 and 9, each heating head of the heating carousel 41 is designed so as to clamp the sheet-like blank G at its center instead of at its periphery, through stems 471, 472 which are axially mutually opposite with respect to the clamping plane P and can mutually move within respective heat sources 473, 474 of the heating head along the clamping axis C, which is substantially parallel to the central axis H of rotation of the heating carousel 41.

The central area of the blank G at which the stems 471, 472 apply a hold is an area which can be not affected by the thermoforming, i.e. for which no deformation is needed in order to make the container from the heated blank G at the thermoforming station 5.

The heat sources 473, 474 of FIGS. 8 and 9 can also move along the clamping axis C, and in particular they are moved by way of an actuation independent of the actuation that mutually moves the two stems 471, 472. The stems 471, 472 are sized so as to move between a retracted position, in which they do not protrude and are preferably flush with the heating surfaces 475, 476 of heat sources 473, 474, and an extended position in which the stems 471, 472 centrally protrude from the heating surfaces 475, 476 so as to keep the blank G clamped between the stems 471, 472. It is noted that, with this arrangement, a heating head of a single diameter can be used with various blanks G having different diameters, because the "cold" area to be used for clamping the blank is independent of the diameter of the blank, being it always at the center of the blank.

In practice it has been found that the disclosure fully achieves the intended aim and advantages.

The disclosure, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102017000014665 (UA2017A000847) from which this application claims priority are incorporated herein by reference.

The invention claimed is:

1. A station for heating thermoplastic blanks for a thermoforming line, the station comprising: a heating carousel configured to rotate continuously about a central axis and which has a plurality of heating heads radially spaced apart from said central axis, each heating head being adapted to receive at least one respective thermoplastic blank at a first peripheral region which is outside the carousel, to retain said at least one blank during the rotation of the carousel while supplying heat to said at least one blank, and to release said at least one blank to a second peripheral region which is outside the carousel and is angularly spaced apart from the first peripheral region, wherein said heating head comprises clamping means adapted to retain said at least one blank on a clamping surface of said blank during heating of said blank, wherein said clamping means comprise at least two jaws, which are mobile with respect to each other along an axis which is substantially parallel to the central axis of rotation of the carousel in order to clamp between said jaws said at least one blank at said clamping surface, wherein said heat is supplied to an area of said blank that is not affected by said clamping;

wherein said heating head comprises at least one heat source associated with said clamping means, wherein said at least one heat source is configured to move with respect to said clamping surface along said axis which is substantially parallel to the central axis by way of an actuation that is independent of an actuated quadrilateral mechanism that mutually moves said at least two jaws, so as to heat said area of said blank that is not affected by said clamping.

2. The heating station according to claim 1, wherein said clamping surface is provided at a peripheral region of said blank.

3. The heating station according to claim 1, wherein said jaws are mounted to slide on a same straight guide which is fixed on a peripheral region of the heating carousel and are connected to said articulated quadrilateral mechanism which is associated with a cam follower, said heating station further comprising a fixed cam configured to interact with said cam follower so as to mutually approach or space apart said jaws through said articulated quadrilateral.

4. The heating station according to claim 3, wherein said articulated quadrilateral mechanism comprises a rocker which has a fulcrum mounted rotatably on a fixed point of the peripheral region of the heating carousel and has two ends, one of said ends is associated with said cam follower, said jaws being connected by way of first and second links to a respective end of said rocker so that a rotation of said rocker caused by the interaction of said cam follower with said fixed cam entails the mutual approach or spacing apart of said jaws.

5. The heating station according to claim 1, wherein said heat source is mounted on a pair of supports configured to be moved mutually closer from opposite sides toward said clamping surface.

6. The heating station according to claim 5, wherein said supports of the heat source comprise a surface for the transmission of heat which has a surface extent that is smaller than an area of a face of said at least one blank to be heated, so that the clamping performed by said jaws occurs in a peripheral sector of the blank that is not heated by said heat source.

7. A method of continuously heating thermoplastic blanks for subsequent thermoforming, including the following steps:

continuously rotating a carousel about a central axis, said carousel having a plurality of heating heads radially spaced apart from said central axis, feeding thermoplastic blanks to said heating heads at a first peripheral region which is outside said carousel, so that each heating head that passes through said first peripheral region receives a respective blank, during said rotation, holding said blanks in the respective heating heads and applying heat to said blanks by at least one heat source associated with said clamping means, releasing said blanks to a second peripheral region around the carousel that is angularly spaced apart from the first peripheral region, wherein in each one of said heating heads, said holding is carried out by clamping said respective blank on a clamping surface of said blank during said heating, said clamping comprising moving with respect to each other, along an axis which is substantially parallel to the central axis, at least two jaws of clamping means in order to clamp between said at least two jaws said blank, and wherein said heat is applied to an area of said blank that is not affected by said clamping; and during said rotation, moving said heat source with respect to said clamping surface along said axis which is substantially parallel to the central axis by way of an actuation that is independent of an actuated quadrilateral mechanism that mutually moves said at least two jaws, so as to heat said area of said blank that is not affected by said clamping.

8. The method of claim 7, wherein the blanks have a disk shape and a reduced thickness at their periphery.

* * * * *